No. 627,607. Patented June 27, 1899.
C. E. WALTERS.
RUBBER VEHICLE TIRE.
(Application filed May 15, 1899.)
(No Model.)

Witnesses:
Charles Godshall.
Nellie M. Danforth.

Inventor:
Charles E. Walters.
By Humphry & Humphry,
Attys.

UNITED STATES PATENT OFFICE.

CHARLES E. WALTERS, OF AKRON, OHIO.

RUBBER VEHICLE-TIRE.

SPECIFICATION forming part of Letters Patent No. 627,607, dated June 27, 1899.

Application filed May 15, 1899. Serial No. 716,875. (No model.)

*To all whom it may concern:*

Be it known that I, CHARLES E. WALTERS, a citizen of the United States, residing at Akron, in the county of Summit and State of Ohio, have invented a certain new and useful Improvement in Rubber Vehicle-Tires, of which the following is a specification.

My invention has relation to improvements in that class of vehicle-tires in which the wheel is surrounded by a channeled metallic tire in which it rests in tension, a tire of vulcanized rubber reinforced by parallel wires running longitudinally near its base also placed in tension to assist in retaining the rubber portion.

As at present constructed the rubber tires are formed with longitudinal holes to receive the wire and in which the wires are afterward thrust, and to accomplish the latter process the holes must be of sufficient size to permit the wires to enter readily. As a result there is a small space between the wires and rubber that permits the entrance of water, which results in rapidly corroding the wires until they are practically destroyed in a short time and their usefulness destroyed.

To overcome this objection is the object of my invention; and to that object it consists in the peculiar and novel construction, arrangement, and combination of parts hereinafter described and then specifically pointed out in the claims, reference being had to the accompanying drawings, which form a part of this specification.

Figure 1:
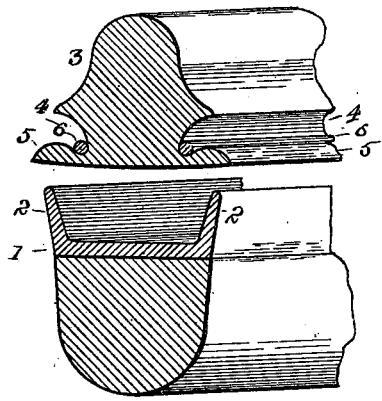
Figure 2:
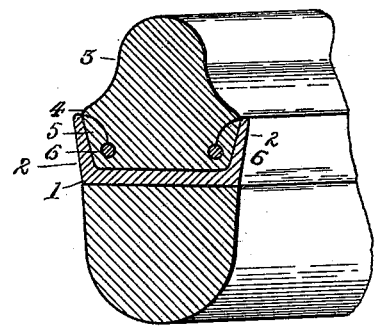

In the accompanying drawings, in which similar reference-numerals indicate like parts in the different views, Figure 1 shows the channeled metal tire and the rubber tire and wires in section before being united, and Fig. 2 is a similar view with these parts united as they will be in use.

Referring to the figures, 1 is a metallic tire which may be of the ordinary construction with slightly-diverging side flanges 2.

The rubber tire 3 presents above the line where the edge of the metal tire-rim stops the usual configuration of this class of tires; but below this line the sides are inwardly hollowed or grooved at 4 nearly to the base, whence a web extends on each side enlarged into a fillet 5, having an upper rounded surface to fit the grooves 4 and a flat under surface to fit the inner faces of the metal tire-flanges.

The bottom of the tire and webs and the grooves and rounded faces of the fillets are covered with canvas or other suitable woven fabric to protect them against wear from the flanges and wires.

In operation the wires 6 are laid along the line between the tire and webs and the tire plane in the channel, by which the fillets 5 are pressed into and fill the grooves 4 and yield by their elasticity about the wires, which they hold firmly at all points. The wires and rubber are joined in any of the well-known methods.

I am aware that a tire has been constructed with straight sides and lateral wings to be compressed between the side flanges of the channel and the sides of the tire-body, and such is not my invention; but

What I claim, and desire to secure by Letters Patent, is—

1. A wheel having a channeled rim provided with an elastic tire-body having side grooves and lateral fillets conformed to fit said grooves and side flanges, and to be compressed between them.

2. A wheel having a channeled rim provided with an elastic tire-body having side grooves and lateral fillets elastically connected therewith, and wires along the lines of union between the tire-body and fillets, said fillets being adapted to fit said grooves and flanges, and to compress said wires.

3. An improved elastic tire for channeled wheel-rims consisting of an elastic body having side grooves, and fillets elastically connected therewith, adapted to fit said channeled rim and grooves, and to be compressed between them, substantially as shown and described.

4. An improved elastic tire for channeled wheel-rims, consisting of an elastic body having side grooves and fillets elastically connected therewith, adapted to fit said channeled rim and grooves, and be compressed between them, said grooves and fillets being faced with woven fabric, substantially as shown and described.

In testimony that I claim the above I hereunto set my hand.

CHARLES E. WALTERS.

In presence of—
C. E. HUMPHREY,
C. P. HUMPHREY.